H. C. J. SCHARMANN.
NUT LOCK.
APPLICATION FILED MAY 15, 1916.
1,204,695.
Patented Nov. 14, 1916.
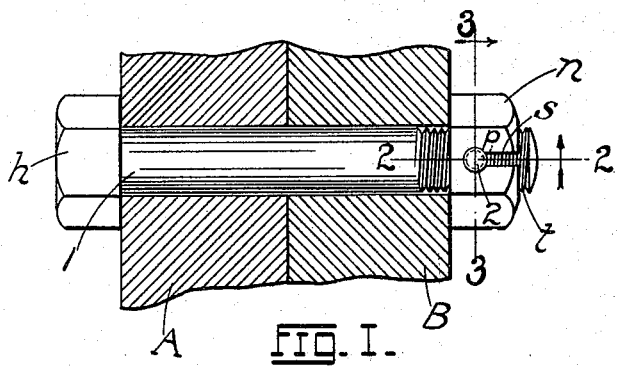
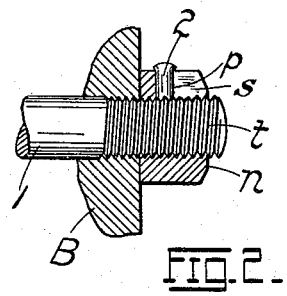
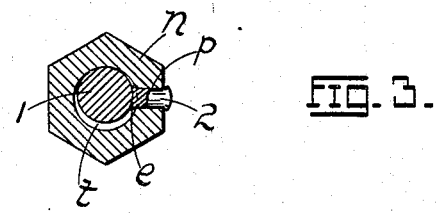
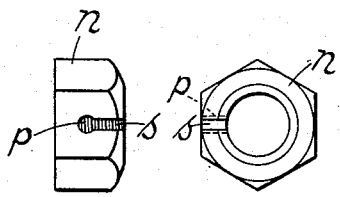  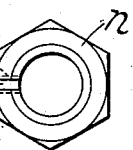  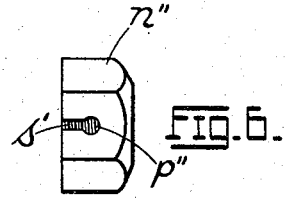
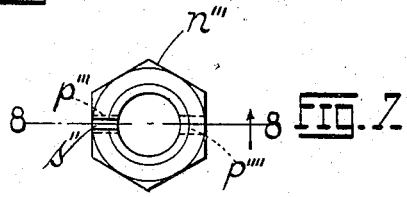
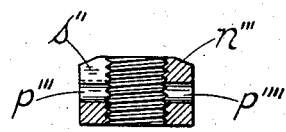
WITNESSES:
Harry Q. Beinney
C. H. Callon
INVENTOR.
Henry C. J. Scharmann
BY
ATTORNEY.

UNITED STATES PATENT OFFICE.

HENRY C. J. SCHARMANN, OF ST. LOUIS, MISSOURI.

NUT-LOCK.

1,204,695.  Specification of Letters Patent.  Patented Nov. 14, 1916.

Application filed May 15, 1916. Serial No. 97,626.

*To all whom it may concern:*

Be it known that I, HENRY C. J. SCHARMANN, a citizen of the United States, residing at St. Louis, State of Missouri, have invented certain new and useful Improvements in Nut-Locks, of which the following is a full, clear, and exact description, reference being had to the accompanying drawings, forming a part hereof.

My invention has relation to improvements in nut-locks; and it consists in the novel features of construction more fully set forth in the specification and pointed out in the claims.

The object of my invention is to provide the ordinary nut with simple means for locking the same against possible loosening when once driven home on its bolt or other member by which the nut is carried, the locking device being eminently applicable to railroad and bridge work, as will more fully appear from the following detailed description of the invention in connection with the accompanying drawings in which—

Figure 1 represents a cross-section of two members fastened together by means of a bolt to which the nut with the improved locking device is applied; Fig. 2 is a longitudinal sectional detail on the line 2—2 of Fig. 1; Fig. 3 is a cross-sectional detail on the line 3—3 of Fig. 1; Fig. 4 is a side view of the nut detached; Fig. 5 is an end view thereof; Fig. 6 is a side view of a modification; Fig. 7 is an end view of a third modification; and Fig. 8 is a longitudinal section on the line 8—8 of Fig. 7.

Referring to the drawings, and for the present to Figs. 1 to 5, inclusive, A, B, represent two members to be secured together, the usual bolt 1 being passed therethrough as well understood in the art, the bolt terminating at one end in a head $h$ and at the opposite end in a nut $n$. In the figures referred to the nut has formed in the wall thereof an opening or passage $p$ disposed at right angles to the axis of the nut, said passage being designed for the reception of a plug 2 of iron or other suitable metal softer than the bolt, the plug being driven through the nut and forcibly against the threads $t$ of the bolt, causing a lateral spreading of the inner end of the plug and a firm embedding of such spread end $e$ between contiguous wraps of the threads as shown to best advantage in Fig. 3. The friction between the spread terminal $e$ of the plug and the threads $t$ of the bolt is sufficient to prevent possible unscrewing of the nut and the nut is thus firmly locked to the bolt. The transverse passage or opening $p$ forms the bottom enlargement of a slot $s$ which opens at the outer end of the nut $n$, the purpose of the slot being to permit the insertion of a suitable tool should it for any reason be desirable to gain access to the plug for purposes of removal or dislodgment at any time.

In the modification shown in Fig. 6 I provide the nut $n''$ with a transverse passage $p''$ from which leads a slot $s'$ through the inner end of the nut. In Figs. 7 and 8, there is a passage $p'''$ and a slot $s''$ corresponding to the passage $p$ and slot $s$ and diametrically opposite the passage $p'''$ the nut $n'''$ in said figures is provided with a passage $p''''$ on the order of the passage $p$ in the form first described. In each instance the passage $p$ or its equivalent $p''$, $p'''$, $p''''$ is intended for the reception of a locking plug such as 2 or its equivalent, the slots $s$, $s'$, $s''$ serving to accommodate a suitable tool to afford access to the plug for purposes of removal or dislodgment.

The details illustrated need not of course be adhered to as these may be varied without departing from the spirit of my invention.

Having described my invention what I claim is:

1. In a nut-lock, a nut provided with an opening in the wall thereof transverse to the axis of the nut, a slot leading from said opening through the nut and opening at one of the ends of the nut, and a locking plug passed through said opening.

2. In a nut-lock, a nut provided with a slot leading from one of the ends thereof to a suitable point on the wall of the nut, and an enlarged opening at the base of the slot, disposed transversely to the axis of the nut.

In testimony whereof I affix my signature, in presence of two witnesses.

HENRY C. J. SCHARMANN.

Witnesses:
 EMIL STAREK,
 C. H. CALLON.

Copies of this patent may be obtained for five cents each, by addressing the "Commissioner of Patents, Washington, D. C."